(12) United States Patent
Bosso et al.

(10) Patent No.: US 6,763,151 B1
(45) Date of Patent: Jul. 13, 2004

(54) ELECTRO-OPTIC MODULATORS WITH INTERNAL IMPEDANCE MATCHING

(75) Inventors: Sergio Bosso, Buccinasco (IT); Emilio Casaccia, Turin (IT); Davide Frassati, Crescentino (IT); Giovanni Ghione, Turin (IT); Aldo Perasso, Genoa (IT); Marco Pirola, Novara (IT)

(73) Assignee: Avanex Corporation, Fremont, CA (US)

( * ) Notice: Subject to any disclaimer, the term of this patent is extended or adjusted under 35 U.S.C. 154(b) by 55 days.

(21) Appl. No.: 09/610,437

(22) Filed: Jul. 3, 2000

Related U.S. Application Data
(60) Provisional application No. 60/144,626, filed on Jul. 20, 1999.

(30) Foreign Application Priority Data

Jul. 2, 1999 (EP) .............................................. 99112827

(51) Int. Cl.[7] .............................................. G02F 1/035
(52) U.S. Cl. ........................ 385/3; 385/1; 385/2; 385/8; 385/129
(58) Field of Search ................................ 385/3, 1, 2, 4, 385/8, 129

(56) References Cited

U.S. PATENT DOCUMENTS

| | | |
|---|---|---|
| 4,372,643 A | 2/1983 | Liu et al. |
| 4,560,246 A | 12/1985 | Cotter |
| 4,850,667 A | 7/1989 | Djupsjöbacka |
| 5,005,932 A | 4/1991 | Schaffner et al. |
| 5,189,547 A | 2/1993 | Day et al. |
| 5,220,627 A * | 6/1993 | Kawano et al. ................. 385/2 |
| 5,572,610 A | 11/1996 | Toyohara |
| 5,696,855 A * | 12/1997 | Skeie ............................ 385/2 |
| 5,787,211 A * | 7/1998 | Gopalakrishnan .............. 385/2 |
| 5,854,862 A * | 12/1998 | Skeie ............................ 385/2 |

FOREIGN PATENT DOCUMENTS

| | | |
|---|---|---|
| EP | 0 565 035 | 10/1993 |
| WO | WO 99/09451 | 2/1999 |

OTHER PUBLICATIONS

M. Izutsu et al., "On the Design of Resonant Electrodes for Efficient Guided–Wave Light Modulators", The Transactions of the IEICE, vol. E 71, No. 4, pp. 342–344, (1988).

* cited by examiner

*Primary Examiner*—Rodney Bovernick
*Assistant Examiner*—Sung Pak
(74) *Attorney, Agent, or Firm*—Moser, Patterson & Sheridan, L.L.P.

(57) ABSTRACT

A resonant optical modulator includes an electro-optical substrate, an optical waveguide formed in the substrate and having a variable index of refraction, and an active modulator electrode formed on the substrate in relation to the waveguide to effect electro-optical variation of the index of refraction upon application to the electrode of a modulating signal. An interface port formed on the substrate provides the modulating signal to the electrode from a signal source and has an impedance. An electrical structure, formed on the substrate and coupled to the interface port and the electrode, makes an impedance of the optical modulator substantially equal to the impedance of the signal source. The electrical structure includes a delay line and a stub formed on the substrate.

18 Claims, 6 Drawing Sheets

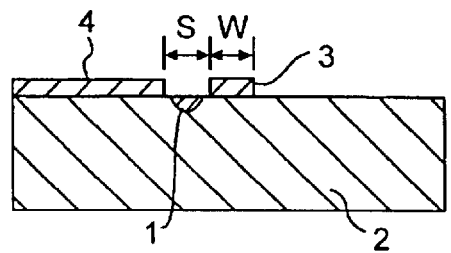
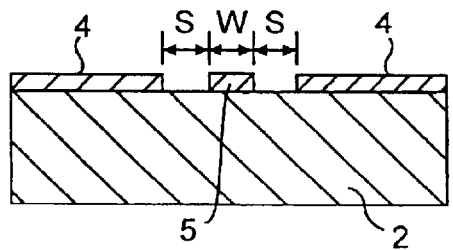
FIG. 5A   FIG. 5B
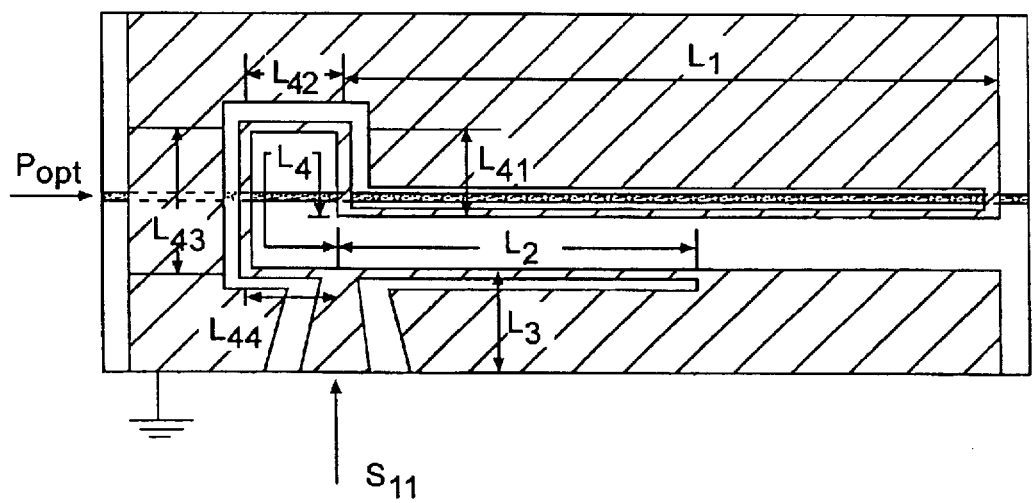
FIG. 6

ELECTRO-OPTIC MODULATORS WITH INTERNAL IMPEDANCE MATCHING

This application claims the benefit of U.S. Provisional Application No. 60/144,626, filed Jul. 20, 1999, the content of which is incorporated herein by reference.

BACKGROUND OF THE INVENTION

The present invention relates generally to electro-optic modulators and, more particularly, to optical modulators having an internal structure for matching impedance with coaxial connectors.

The operation of electro-optic modulators is based on the interaction between an electrical microwave, or radio frequency (RF), modulating signal and an optical signal. An optical modulator is typically obtained by utilizing the electro-optical effect of the modulator's waveguide material. This effect comprises changing, through an applied electric field, the index of refraction of the optical waveguide in which the optical signal propagates. This variation in time of the refractive index produces a desired phase modulation of the optical signal traveling through the waveguide. An amplitude modulator can be made by exploiting the above phase modulation in at least one arm of a waveguide interferometer, e.g., a Mach-Zehnder interferometer.

To obtain a modulator, it is necessary to have an optical waveguide carrying an optical signal and an electrode structure responsive to an applied RF signal that permits generation of the electric field necessary for modulating the optical signal. To increase the modulating effect, that is, the phase variation of the optical signal versus the amplitude of the applied RF signal, interaction between the optical signal and the electric field should be distributed along a planar microwave waveguide structure. The optical beam is made to propagate parallel to the planar microwave waveguide structure. In this way, the optical signal undergoes phase variations induced by the microwave signal along the entire length microwave waveguide.

An example of such a substrate and electrode structure is shown in FIG. 3. FIG. 3 is a top view of an electro-optic substrate 2 with an optical waveguide 1 running through it. Electrode 3 generates an electric field along its entire length. Thus, an optical signal propagating through waveguide 1 undergoes phase modulation along the entire length of electrode 3.

To obtain an increased modulating effect, proper electro-optic substrates, wherein the applied RF field can induce a significant variation of the refraction index, are exploited to guide the optical signal. An example of a useful material for such a substrate is Lithium Niobate, $LiNbO_3$. A known, less preferred alternative material is Lithium Tantalate, $LiTaO_3$.

Moreover, the coupling between the propagating optical and microwave signal must be synchronous to allow the phase variation induced by the microwave signal to increasingly add up throughout the whole structure. Synchronous coupling can be achieved by proper design of the microwave line, i.e. by making the effective index of the line equal to the optical effective index. This result may be obtained in several ways, for instance by increasing the electrode thickness and growing the electrodes on a thin, low dielectric constant, buffer layer.

The optimization of the electrode region with respect to synchronous propagation and maximum electro-optical interaction usually leads to lines of very small width, which cannot be directly connected to a planar-to-coaxial transition. This problem is usually solved by means of a transmission line taper, such as 5 in FIG. 3. The taper leads at a constant characteristic impedance from the small modulator line 3 to the comparatively large dimension at the exterior of modulator 2. Standard coaxial transitions require this larger dimension as an interface. The resulting input impedance levels of the modulator, however, tend to be much lower than 50 ohms, which is the standard reference impedance for which coaxial connectors and RF generators are currently designed.

This mismatch in source and load impedances results in numerous problems, such that the source and load impedances should be "matched." Impedance matching, as generally understood, comprises making a source impedance and a load impedance substantially equal, for instance, to allow the maximum transfer of electrical power from the source to the load. In the instant implementation, the source is an RF generator/coaxial cable, and the load is the optical modulator electrodes.

Input impedance matching is desirable in optical modulators, because besides increasing the input electrical power fed into the modulator, it also decreases multiple reflections and signal distortion. Because a change in refractive index in the substrate is directly related to the amount of RF electrical power input to the modulating electrode, the amplitude of optical modulation achievable at a given RF generator power is also increased when impedances are matched.

Patents in the field of electro-optic modulation describe various schemes, including providing an external matching network, for matching the impedance of optical modulators with their respective modulating signal sources.

U.S. Pat. No. 5,189,547 (Day et al.) describes a tunable adaptive external circuit connected to a bulk electro-optical modulator for impedance matching. This external driving circuit is connected between the signal generator and the modulator. The driving circuit includes discrete components that are hand-adjustable to match the impedance of the modulator with that of the signal generator.

U.S. Pat. No. 5,572,610 (Toyohara) describes an impedance matching means for matching an impedance of a control signal source and a signal electrode for a wide band waveguide-type optical device.

In the field of microwaves, a "resonant" line is a line connected to a load having a drastically different impedance from the characteristic impedance of the line itself. In electro-optical modulators, the characteristic impedance of the "hot" (i.e., carrying the RF signal) electrode is typically several tens of ohms, for example 20–50 ohms. Typical configurations for a resonant modulator are: an open circuit RF electrode ("infinity" impedance of the load); and the RF electrode short-circuited to ground ("zero" impedance of the load). Other configurations are possible, as a RF electrode connected to a load having an impedance of few ohms or of several kilo-ohms, for example. A good parameter which can be used in defining "resonant" is the modulus of the $\Gamma$ coefficient, which is defined as:

$$\Gamma = \frac{Z_L - Z_0}{Z_L + Z_0}$$

where: $Z_L$ is the impedance of the load, and
$Z_0$ is the characteristic impedance of the line (RF electrode).

$|\Gamma|$ has a value in the range from 0 to 1. If $|\Gamma|=0$, i.e., if $Z_L=Z_0$, the line is under a traveling-wave condition. If $|\Gamma|\sim 1$, i.e., if $Z_L=0$ or $Z_L>>Z_0$, the resonance condition is met.

Henceforth, the following practical definition of resonance will be used: a modulator is of the "resonant" if type $|\Gamma| \geqq 0.5$. A preferred resonance condition corresponds to $|\Gamma| > 0.8$.

Resonant modulators are highly efficient in narrow bands around some resonance frequencies $f_0$. Such high efficiency has been verified for frequencies around above some GHz, generally from 0.5 to 5 GHz, and preferably from 1 to 4 GHz. A typical frequency band of interest for resonant modulation is that around 2 GHz. An exemplary application of resonant modulators is phase modulation at 2 GHz for stimulated Brillouin scattering (SBS) suppression in cable television (CATV) systems. In such systems, high modulation efficiency can be exploited to save modulation power, resulting in less heating and reduced thermal stabilization problems.

For further details regarding resonant configuration and phase modulation for SBS suppression, please refer to WO 99/09451.

Impedance mismatch between the load and the line becomes a serious problem if the modulator design is of the resonant type. This problem gets worse the closer the $|\Gamma|$ value is to 1 near the resonant frequencies of interest. In this case, namely, the center band impedance becomes almost imaginary. Applicants have determined that the impedance of a resonant modulator, e.g. the modulator of FIG. 3, has typically a real (resistive) part lower than 10 ohms and an imaginary (reactive) part higher than 50 ohms. The impedance mismatch between the RF signal source and the modulator is conventionally eliminated by attaching to an external, concentrated network.

U.S. Pat. No. 4,372,643 (Liu et al.) discloses a standing-wave, velocity matched gate including an optical directional coupler that has a pair of electrodes located over the waveguide. The electrodes form an electrical transmission line that is energized at its input by a signal source having an output impedance R. In one embodiment, the transmission line is terminated by a short circuit and the electrodes are proportioned such that the input impedance of the line has a real part that is equal to R. The imaginary component of the transmission line is resonated by an external impedance connected across the input end of the line.

U.S. Pat. No. 4,850,667 (Djupsjöbacka) relates to an electrode arrangement for optoelectronic devices. A first elongate electrode has a connecting conductor for an incoming microwave signal with the aid of which a light wave is to be modulated. The connecting conductor divides the first electrode into a standing wave guide and a traveling wave guide, which is connected via a resistor to a U-shaped second electrode. It is stated in the '667 patent that the incoming modulating microwave has maximum modulating ability in the standing waveguide if its frequency is in agreement with the resonance frequency fc of the standing wave guide. In one embodiment, the connecting conductor is grounded.

U.S. Pat. No. 5,005,932 (Schaffner et al.) describes a traveling-wave electro-optical modulator with a periodic electrode structure of the intermittent interaction type. This electrode structure has a plurality of middle stubs to maintain the phase of the RF drive frequency in phase with the optical signal. This electrode structure makes possible the modulation of optical signals by RF signals above microwave frequencies. Impedance transforming and impedance matching characteristics are built into the modulator and this facilitates connection of the RF source since no extra impedance matching circuitry is required. Impedance transforming is performed by tapered input and output openings. The impedance matching is carried out by end stubs which are shorter than the middle stubs. The impedance matching stubs serve to transform the impedance of the periodic electrode structure to the impedance of an unperturbed linear RF coplanar waveguide. The impedance transforming sections serve to bring the impedance level seen by the RF signal at a location just outside the impedance matching stub up to the impedance level of the source and the load.

Applicants remark that impedance transforming circuitry and impedance matching features like those disclosed in the Schaffner et al. patent in combination with a traveling-wave relatively-broad-band electrode structure, cannot be used with a resonant modulator, as they would not allow to compensate the almost imaginary impedance of a resonant modulator.

Applicants have noticed that an external impedance matching network imposes additional costs, not only for the matching components, but also for the separate packaging and connectors for the interface between the modulator and the RF generator. Similarly, Applicants have recognized that the overall dimension of the system having an external impedance matching network is large due to these external components. As well, the reliability and repeatability of the external matching is undesirably low, due to variation in the component values and parasitic impedances of the external components.

SUMMARY OF THE INVENTION

Applicants have noticed that external matching, e.g., the simple integration within the package of a circuit comprising concentrated elements, such as capacitors, resistors and/or inductors, results in a very low reliability above 1–1.5 GHz. In such a case, the parasitic impedances induced by the strips used for soldering the concentrating elements in a circuit can cause a shift in the expected resonance frequency, resulting in an unpredictable impedance value for the integrated modulator and in an unreliable impedance matching between the RF signal source and the device.

Applicants have discovered that an appealing solution from the standpoint of space, cost, performance, and performance repeatability is provided by a matching network fully integrated within the optical modulator. Such an integrated matching network is realized, in the selected planar technology, on the same electro-optic substrate whereupon the modulator is implemented.

Applicants have further discovered that if the modulator is resonant, the matching network can be given a simple topology based on stub-line arrangements. In particular, the matching network may be placed between the modulator input and the coaxial connector, and may partially replace the constant impedance transition.

Applicants have still further discovered that the final taper leading from the matching section to the coaxial transition can be either with a non-optimal impedance or can be given an impedance so as to provide an additional degree of freedom in the matching section. It can be used as part of the matching network itself. By proper design and use of internally matched planar waveguides, an extremely compact layout may be obtained, thus enabling full compatibility, in terms of mounting, dimensions and position of external connectors, with previous designs based on external impedance matching.

In one aspect, an optical transmission system according to the invention comprises: an optical source for generating an optical signal; an RF signal source for generating an RF signal at a predetermined frequency, the RF signal source having an impedance; a resonant optical phase modulator for modulating the phase of the optical signal according to the RF signal; an optical amplifier for amplifying the optical signal to a power greater than 6 dBm; an optical fiber line for transmitting the amplified and phase modulated optical signal. The resonant optical phase modulator includes: an electro-optical substrate; an optical waveguide formed in the substrate and having a variable index of refraction; an active modulator electrode formed on the substrate in relation to the waveguide to effect electro-optical variation of the index of refraction upon application to the electrode of a modulating signal; an interface port formed on the substrate and providing the RF modulating signal to the electrode; an electrical structure, formed on the substrate and coupled to the interface port and the electrode, an impedance of the optical modulator including the interface port and the electrical structure being substantially equal to the impedance of the RF signal source.

In another aspect, a resonant optical modulator consistent with the invention includes an electro-optical substrate, an optical waveguide formed in the substrate and having a variable index of refraction, and a resonant active modulator electrode formed on the substrate in relation to the waveguide to effect electro-optical variation of the index of refraction upon application to the electrode of a modulating signal at a frequency around a resonant frequency. The modulator also includes an interface port formed on the substrate which provides the modulating signal to the electrode from a signal source, which has an impedance, and an electrical structure, formed on the substrate and coupled to the interface port and the electrode, for making an impedance of the optical modulator substantially equal to the impedance of the signal source.

Preferably, the active modulator electrode is connected to ground.

Preferably, the electrical structure includes a delay line connected between the interface port and the electrode, as well as a resonant stub connected at one end to the interface port. For example, the resonant stub is connected to ground at a second end or, in alternative, is open circuited at a second end. Typically the delay line has a length greater than $\lambda/40$, where $\lambda$ is the wavelength in the delay line of a RF signal at the resonant frequency.

According to an embodiment, the interface port is tapered from the signal source down to its connection with the delay line.

Typically, the impedance of the signal source is 50 ohms.

Preferably, the resonant frequency is in the range of 0.5 to 5 GHz, more preferably in the range of 1 to 4 GHz.

In still another aspect, a resonant optical modulator consistent with the invention includes an electro-optical substrate, an optical waveguide formed in the substrate and having a variable index of refraction, and an active modulator electrode having a termination to ground and formed on the substrate in relation to the waveguide to effect electro-optical variation of the index of refraction upon application to the electrode of a modulating signal at a resonant frequency. The modulator of this aspect further includes an interface port formed on the substrate for providing the modulating signal to the electrode from a signal source, a first electrical element formed on the substrate and connected between the interface port and the electrode, and a second electrical element formed on the substrate and connected between the interface port and ground.

The total impedance of the electrode, the interface port, the first electrical element, and the second electrical element substantially equals an impedance of the signal source.

Typically an impedance of the electrode is mainly imaginary, and an impedance of at least one of the interface port, the first electrical element, and the second electrical element cancels the imaginary portion of the electrode impedance.

Typically the signal source includes a coaxial connector.

In a fourth aspect, a resonant optical modulator consistent with the invention includes means for modulating an optical signal in an electro-optical substrate, said means for modulating being formed on the substrate, means for providing an electrical modulating signal at a resonant frequency from a signal generating means, the means for providing being formed on the substrate, and means, coupled to the means for providing and the means for modulating, for causing an impedance of the optical modulator to be substantially equal to the impedance of the signal generating means. The means for causing is preferably formed on the substrate.

In an embodiment, the means for modulating is connected to ground.

The means for causing advantageously includes a means for delaying the modulating signal connected between the means for providing and the means for modulating and, preferably, the means for causing also includes a shunt means connected between the means for providing and ground.

Typically, the means for providing decreases in width from the signal generating means to its connection with the means for delaying.

Conventionally, the impedance of the signal generating means is 50 ohms.

In another aspect, an electrode structure consistent with the invention, for an optical modulator disposed on an electro-optical substrate having an optical waveguide extending through it, includes a first electrode symmetrically disposed between first and second portions of a ground plane, and having a width decreasing from an edge of the substrate to a node. A second electrode extends in one direction from the node and connects to the first portion of the ground plane. A third electrode extends in another direction from the node and has an end near the optical waveguide. A fourth electrode connected to the end of the third electrode near the optical waveguide, extends parallel to the optical waveguide and connects to the second portion of the ground plane.

Preferably an impedance of the electrode structure, viewed from an input to the first electrode, is substantially equal to an impedance of a signal source connected to the input of the first electrode. More preferably, a total impedance of the second, third, and fourth electrodes, viewed from the node, is substantially equal to the impedance of the signal source connected to the input of the first electrode.

In an embodiment, the third electrode includes at least two orthogonal portions.

Typically, a modulating signal in the fourth electrode modulates an optical signal traveling through the optical waveguide.

It is to be understood that both the foregoing general description and the following detailed description are exemplary and explanatory only and are intended to provide further explanation of the invention as claimed. The following description, as well as the practice of the invention, set forth and suggest additional advantages and purposes of the invention.

BRIEF DESCRIPTION OF THE DRAWINGS

The accompanying drawings, which are incorporated in and constitute a part of this specification, illustrate embodiments of the invention and, together with the description, serve to explain the advantages and principles of the invention.

FIG. 5A is a cross-sectional view, taken along the line 5a—5a in FIG. 4.

FIG. 5B is a cross-sectional view, taken along the line 5b—5b in FIG. 4.

FIG. 6 is a top view of an electro-optic phase modulator utilizing a built-in impedance matching network, with the dimensions of various portions labeled.

DETAILED DESCRIPTION OF THE PREFERRED EMBODIMENTS

Figure 1:
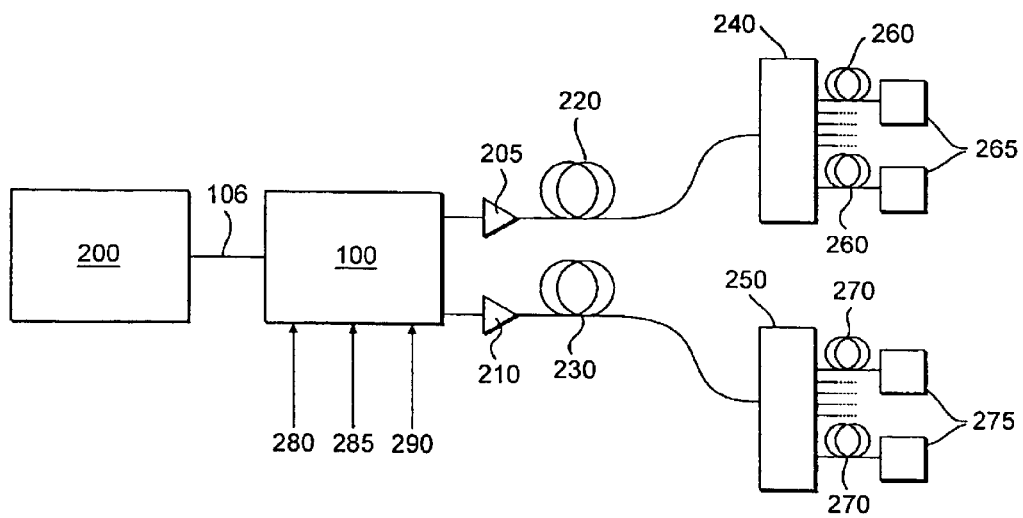
FIG. 1 is a schematic representation of a CATV transmission system according to the present invention.

Reference will now be made to various embodiments according to this invention, examples of which are shown in the accompanying drawings and will be obvious from the description of the invention. In the drawings, the same reference numbers represent the same or similar elements in the different drawings whenever possible.

A CATV transmission system according to the invention is schematically shown in FIG. 1. The output of a laser source 200, such as a semiconductor laser source (e.g., a DFB laser), is coupled via a single mode optical fiber 106 to the input of an electro-optical modulator 100. Typical wavelength values for the laser source 200 are, for example, in the range 1540–1560 nm or in the range 1300–1320 nm. Fiber 106 is preferably a polarization maintaining fiber.

Figure 2:
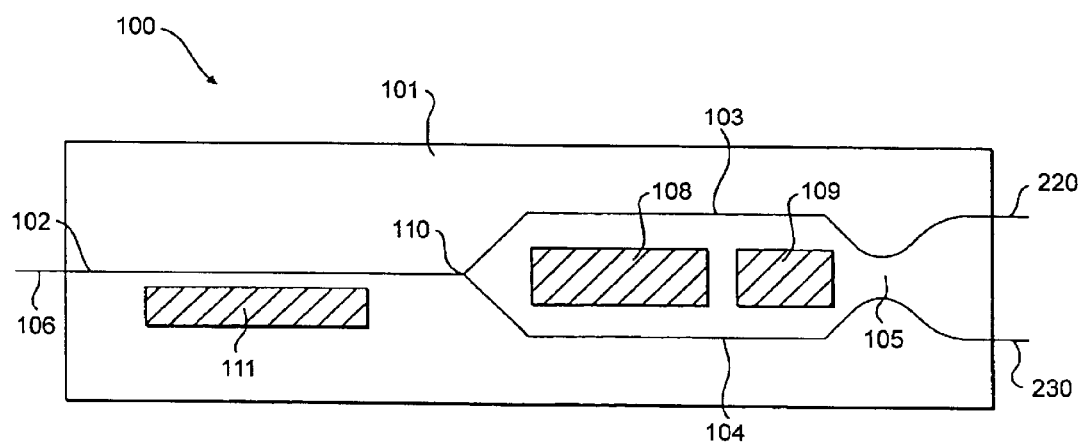
FIG. 2 is a detailed view of the optical modulator shown in FIG. 1.

The optical modulator 100, which is particularly adapted for use in CATV systems, is schematically shown in FIG. 2. The modulator 100 is formed on a planar substrate 101. On the substrate surface, an interferometric Mach-Zehnder waveguide configuration is formed in a manner known to those skilled in the art. The planar substrate and the waveguides are made in any material convenient to the skilled in the art, for example, in one or a combination of the following material systems: semiconductors of the III–V or II–VI group, Si, glass, silica, polymer, ferroelectric and/or electro-optic materials. In a preferred embodiment the substrate is an x-cut lithium niobate crystal and the waveguides are made by titanium diffusion.

The waveguide configuration may comprise, as shown in FIG. 2, an input waveguide 102 at a first end of the substrate 101, a bifurcation 110, such as a Y-splitter, and two waveguide arms 103, 104. Arms 103, 104 come close together to form a directional coupler 105 and then separate again to terminate at an end of the substrate (dual-output modulator). The relative distance between waveguides 103, 104 at the substrate end is selected in relation to the technology chosen to couple the waveguide outputs to optical fibers. An exemplary value for the waveguide distance is 140 $\mu$m. According to an alternative embodiment, a Y-coupler can be used in place of the directional coupler 105. In such case, a single waveguide terminates at the end of the substrate (single-output modulator). Waveguides 102, 103, 104, are single-mode waveguides at the device operating wavelength.

Ground electrodes (not shown) are laid down on the substrate 101 and connected to a suitable voltage reference (ground reference). A RF electrode 108 and a bias electrode 109 are laid down in the central region of the substrate 101, between the waveguide arms 103, 104. The length of the RF electrode is preferably between 30 and 50 mm. The length of the bias electrode is preferably between 5 and 15 mm. According to a further alternative embodiment, not shown, a single electrode is present for RF and bias.

Y-splitter 110, waveguide arms 103, 104, directional coupler 105 (or Y-coupler in the single-output configuration), RF electrode 108 and bias electrode 109 form an amplitude modulator. A phase modulation electrode 111 is advantageously arranged on the same substrate 101, on the side of the input waveguide 102, to modulate the phase of the input optical signal by an SBS suppression signal. Waveguide 102 and phase electrode 111 form a phase modulator. In particular, the phase modulator is a resonant phase modulator as described below with respect to FIGS. 3–8. Such phase modulator can also be formed on a separate chip, which is optically connected to the above described amplitude modulator.

Returning to FIG. 1, an information bearing RF signal 285, for example a CATV signal, is input to modulator 100, so as to superpose the information to the optical signal. A bias voltage 290 is also input to modulator 100 to bring its operating (bias) point in a linear response region. An additional electrical input for an SBS suppression signal 280 is provided on modulator 100.

It is known that an optical signal propagated along an optical fiber may give rise to the generation of radiation by stimulated Brillouin scattering (SBS). This is a nonlinear effect that occurs when the optical power at the fiber entrance exceeds a given threshold (typically about 6 dBm for a narrow bandwidth source having a spectral bandwidth of less than 20 MHz). This phenomenon may constitute a source of noise capable of hindering the correct reception of the signal at the termination of the optical fiber.

It is also known, for example from U.S. Pat. No. 4,560,246 and EP 565,035, that the threshold optical power at which stimulated Brillouin scattering occurs in an optical fiber increases if the frequency band of the propagated optical signal is increased by phase modulation.

The two outputs of dual-output modulator 100 are coupled each to an optical fiber line 220, 230, provided to transmit the modulated signal to respective distribution stations 240, 250. Each of the latter distribution stations can comprise an optical coupler to split and distribute the optical signal, via respective optical fiber lines 260, 270, to receiving units 265, 275. At the receiving units, the optical signal is converted to electrical signals and sent to respective RF distribution networks or, alternatively, directly to end users. If modulator 100 is single-output, a single fiber line 220 and a single distribution station 240 are present.

Fiber lines 220, 230, 260, 270 are preferably monomodal. Multimode fibers, however, can be advantageously adopted to cover relatively short line sections, e.g., in the range of few km. Multimode fibers, in particular, can be adopted for the signal distribution fiber network (260, 270).

Optical amplifiers 205, 210, for example erbium doped fiber amplifiers, can be provided at one or at each output of modulator 100 to boost the optical signal and increase the transmission distance along fibers 220, 230 and/or to increase the number of receiving units 265, 275 to be reached by the optical signal. To fulfill the specific needs of a signal distribution network, those skilled in the art may, according to known techniques, arrange additional optical amplifiers (not shown) along optical fibers 220, 230, 260, 270 and/or at the output of distribution stations 240, 250. The schematic distribution network 240, 250, 260, 270, 265, 275 shown in FIG. 1 can be adapted by those skilled in the art to the specific needs that arise in each practical case, e.g., by selecting an appropriate number and arrangement of distribution stations, optical fibers and receiving units.

The power and the frequency of the phase modulating electrical signals are selected, according to known relations, in such a way as to obtain the requisite widening of the band of the optical signal. For example, a power of 30–35 dBm and a frequency of about 2 GHz are used in combination with an output power of 16 dBm of amplifiers 205, 210, a band of 0–860 MHz for the CATV signals and a length of about 50 km for optical fibers 220, 230.

A resonant optical modulator according to the present invention will now be discussed. First, the structure and operation of a conventional resonant phase modulator will be described.

Figure 3:
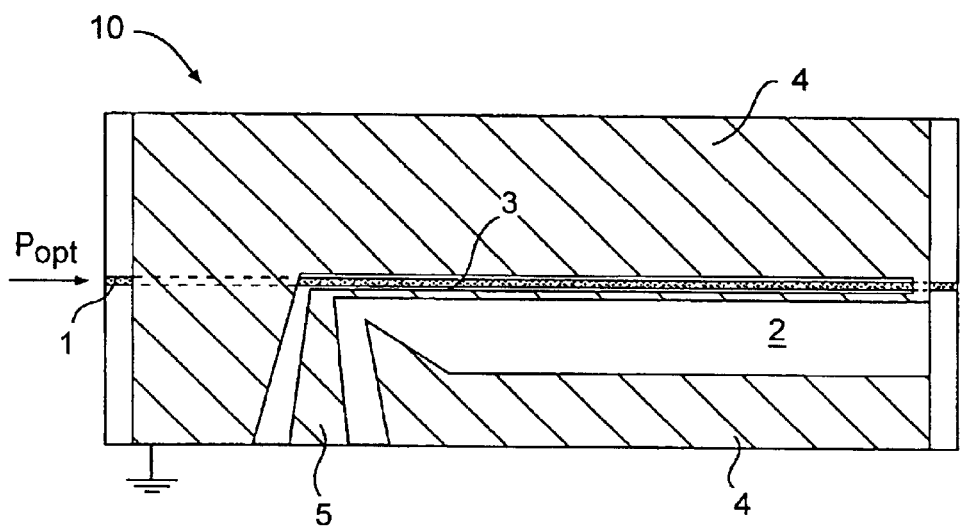
FIG. 3 is a top view of a conventional electro-optic phase modulator requiring an external impedance matching network.

A conventional electro-optic resonant phase modulator 10 is illustrated in FIG. 3. The optical power $P_{opt}$ is coupled from an optical fiber (not shown) into the optical waveguide 1 at the left side of the figure. The optical signal propagates through the length of the modulator 10, and exits at the right side of the figure. The optical waveguide 1 is realized in an electro-optic substrate 2 by diffusion of, for example, titanium into the substrate. The electro-optic substrate 2 may be formed of some suitable material with an electrically variable index of refraction, including $LiNbO_3$. A microwave modulating signal from a signal source (not shown) is input into a coplanar waveguide launcher 5 that is preferably tapered. The tapered launcher 5 allows, at its broader end, easier interface with a conventional round coaxial connector from the modulating signal source. The launcher 5, which may also be referred to as an interface port, is connected to the active modulator electrode 3. The active electrode 3 is short-circuited by a connection with the ground electrode 4, in a resonant electrode configuration, near the end of the substrate where the optical power exits.

Modulation of the optical signal takes place because of the electro-optic effect, which is due to the electric field between the active electrode 3 and the ground plane 4. The modulator is realized in an asymmetric coplanar waveguide, and the optical guide runs between electrodes 3 and 4. This optimizes electro-optic interaction in the case of an x-cut, y-propagating $LiNbO_3$ crystal. To improve phase velocity matching between the optical and the microwave signals, a low dielectric constant buffer layer (not shown) is grown on the upper surface of the substrate, and a suitably thick metallic layer (gold (Au) for example) is exploited for the electrodes.

In order to achieve good narrowband modulation efficiency, the shorted active modulator coplanar line 3 is conventionally designed so as to be nearly resonant at the centerband frequency f0. Owing to this feature, the center band input impedance is nearly imaginary, and the input modulator reflection coefficient S11 (defined as 10 $Log(P_{refl}/P_{ins})$ where $P_{ins}$ is the available RF power from the signal source and $P_{refl}$ is the reflected RF power) is close to zero (about –2 dB). This means that the available power from the signal source at the centerband frequency f0, if directly applied to the modulator, would be mostly reflected. Thus, an external impedance matching network is typically used for the conventional electro-optic resonant phase modulator 10 shown in FIG. 3. This external network is generally disposed between the input port 5 and the coaxial connector.

Figure 4:
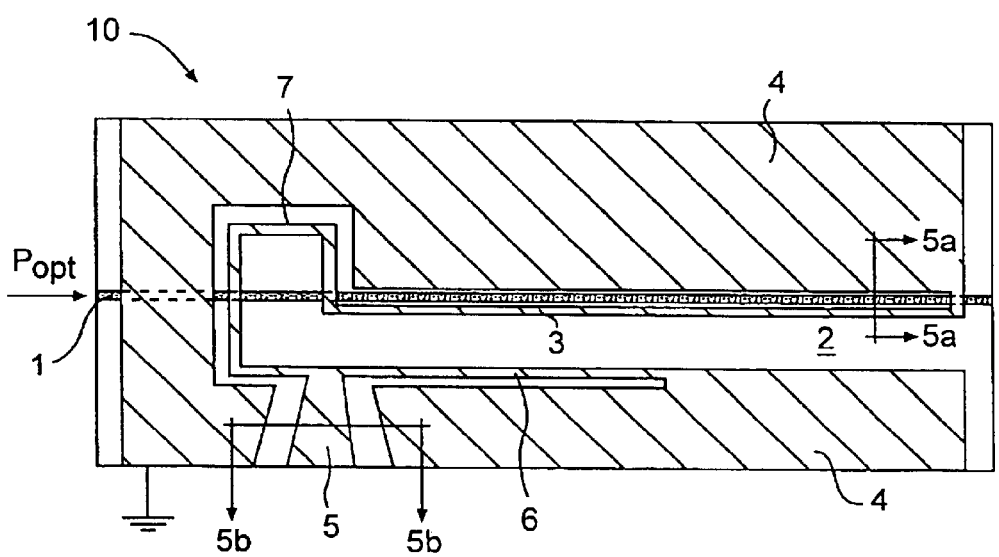
FIG. 4 is a top view of an electro-optic phase modulator utilizing a built-in impedance matching network.

FIG. 4 shows one embodiment of the present invention. Where there are identical components, the same reference numerals as in FIG. 3 will be used. The optical modulator 10 comprises a lithium niobate substrate 2. Though in FIG. 4 a right angle is shown between the end and side surfaces of the substrate, an actual angle of approximately 6° with respect to a line normal to the side surfaces is generally used in practice. This small deviation from a right angle between end and side surfaces avoids backreflections in the optical fiber due to the transition zone between the fiber and the integrated waveguide 1.

Optical modulator 10 may be fabricated in the following manner. The dielectric waveguide I is formed in the $LiNbO_3$ substrate 2 by, for example, diffusion of titanium. A buffer layer of $SiO_2$, or some other suitable low dielectric constant material, is grown on the lithium niobate substrate and waveguide. Au electrodes 3, 4 ,5, 6, 7 may then be deposited on the dielectric layer by known photolithographic processes, using for example a mask. Such a process may include depositing a layer of metal on the dielectric material, depositing photoresist on the metal layer, selectively exposing the photoresist using a mask embodying a desired electrode geometry, and etching away metal not covered by the exposed photoresist. Like FIG. 3, a short-circuit between the electrode 3 and the ground electrode 4 is also realized.

In general, electrode 3 is a nearly resonant line at a centerband frequency f0. Alternative to the short circuit layout of FIG. 4, other configurations for resonant electrode 3 are possible, as discussed above.

Applicant has verified that a modulator according to the present invention can be designed to provide a highly efficient narrow band modulation around a resonance frequency in the range 0.5 to 5 GHz. A preferred operating band is in the range 1 to 4 GHz.

According to the present invention, the tapered launcher 5, the stub-line 6, and the cascaded delay line 7 comprise an impedance matching network completely integrated within the modulator. As shown in FIG. 4, the stub 6 is a resonant microwave line, connected to the launcher 5 and to the ground electrode 4. According to an alternative embodiment, the stub 6 can be a resonant line, open-circuited at its end opposite to the launcher. The delay line 7 is connected to the launcher 5 and to the active electrode 3. The combination of the stub-line 6 and the cascaded delay line 7 may be generically referred to as an electrical structure. Similarly, the launcher 5 may be generically referred to as an interface port. An equivalent circuit diagram for this impedance matching network will now be described.

Figure 10:
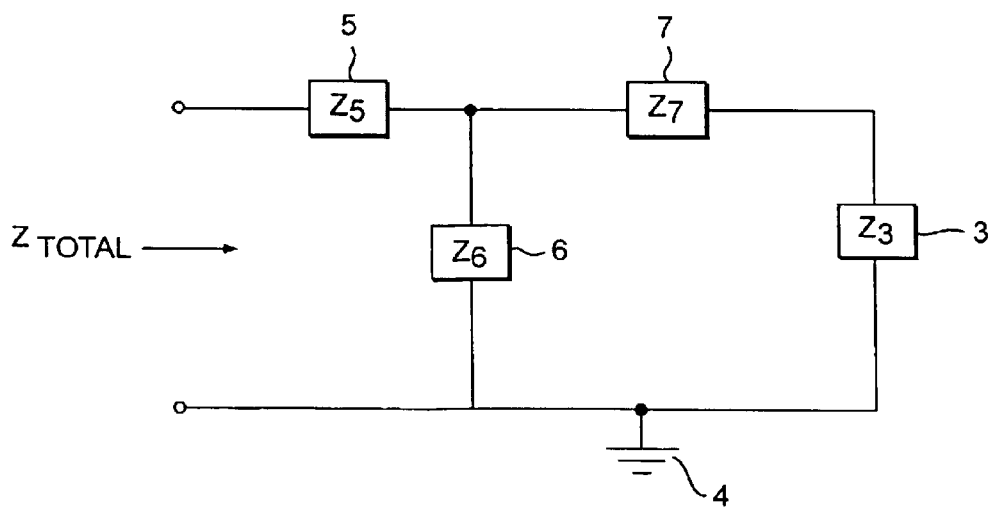
FIG. 10 is an electrical circuit diagram representative of the elements in the electro-optic phase modulator of FIG. 4.

FIG. 10 is an electrical circuit diagram representative of the elements in the electro-optic phase modulator of FIG. 4. The launcher 5 has an impedance $Z_5$; the stub 6 has an impedance $Z_6$; the delay line 7 has an impedance $Z_7$; and the electrode 3 has an impedance $Z_3$. All of these impedances may include both resistive (i.e., real) and reactive (i.e., imaginary) components.

As may be seen from FIG. 10, the total input impedance of the optical modulator 10 should equal the impedance of the modulating signal source. In particular, the impedance $Z_3$ of the active electrode 3, that is mostly imaginary, or reactive, is compensated by the arrangement of the stub 6 and the delay line 7. The tapered launcher 5 transition between a coaxial connector and the combination of the stub 6, the delay line 7, and the electrode 3, both of which being at the same impedance. The launcher 5 (normally 1–3 mm long) guides the modulating signal through the electrode and can additionally perform an impedance transition between the coaxial connector and the electrode.

In a frequency range below 4 GHz, i.e., the wavelength of the RF signal (in the lithium niobate) being higher than about 1.6 cm, the effect of the launcher 5 on the matching network 6, 7 is small and its behavior is similar to that of a simple line, whatever its geometrical form.

At higher frequencies, for example 10 GHz, the launcher 5 begins to have some relevant effect and can be used as part of the matching network 6, 7. Thus, in such frequency range, the geometrical form of the launcher also becomes important and it has to be carefully designed. Such a design would allow the launcher 5 to provide an additional degree of freedom in the design of the matching section.

The wavelength $\lambda$ of the modulating RF signal in a RF waveguide is given by the relationship $\lambda = c/(f \cdot Nm)$, where c is the vacuum speed of light, f is the frequency of the RF modulating signal and $N_m$ is the refractive index of the RF waveguide at frequency f. In the stub, delay line and electrode of a $LiNbO_3$ modulator the refractive index $N_m$ can assume values in the range 3–5, depending on the device parameters, e.g., the thickness and width of the conductor strips and their orientation with respect to the crystal substrate. The wavelength $\lambda$ of the modulating RF signal in the RF waveguide can have, for example, a value in the range of about 1.6 to 10 cm for an RF modulating frequency f in the preferred range between 1 and 4 GHz.

In order to provide a significant effect in matching the almost imaginary impedance of the resonant electrode 3, the delay line 7 has a length in excess of $\lambda/40$. This corresponds to a length greater than 0.4–2.5 mm depending on $\lambda$, for the above indicated exemplary $\lambda$ values. The length of the delay line 7 is preferably around, or in excess of, $\lambda/20$.

Also, to provide a significant impedance matching effect, the stub 6 has a length in excess of $\lambda/40$, corresponding to a length greater than 0.4–2.5 mm depending on $\lambda$, for the above indicated exemplary $\lambda$ values. The length of the stub 6 is preferably around, or in excess of, $\lambda/20$.

The Applicant has observed that the impedance characteristics of the stub 6 and the delay line 7 show a periodic behavior for lengths in excess of $\lambda/2$. To reduce the encumbrance on the substrate and simplify the modulator design, the shortest possible length corresponding to given impedance characteristics are preferably adopted for the stub 6 and the delay line 7. This results in preferred lengths of less than $\lambda/2$ for said elements, i.e., of less than 8–50 mm depending on $\lambda$, for the above indicated exemplary $\lambda$ values.

The design and optimization of the tapered launcher 5, the stub 6 and the cascaded line 7 is carried out starting from experimental and theoretical characterizations of the RF waveguide parameters, e.g., propagation constant, attenuation, and impedance, versus the line dimensions. After such design and optimization of the design, a mask is created for the chosen element geometry, in order to correctly form the elements 3, 4, 5, 6, and 7 on the substrate.

FIG. 5A shows a cross section of the asymmetric coplanar waveguide (ACPW) exploited for the modulator electrode, taken on the line 5a—5a in FIG. 4. The position of the optical waveguide 1 is shown relative to the electrode 3 and the ground electrode 4. The dimension W shows the width of the electrode 3, and the dimension S shows the gap between electrode 3 and the ground electrode 4. The matching sections 6 and 7 have similar cross sections in the ACPW. This geometry allows the use of a single ground electrode, mainly in order to minimize the area on a chip consumed by the optical modulator.

FIG. 5B shows a cross section of the symmetrical coplanar waveguide exploited for the tapered launcher 5, taken on the line 5b—5b in FIG. 4. In order to have a good behavior of the modulator, tapering of the launcher 5 is preferable but not necessary. In a frequency range below about 4 GHz good results can be also obtained with a straight launcher. Alternatively, launcher 5 can comprise a straight portion and a tapered portion, as shown, for example, in FIG. 7. The only requirement for the launcher is symmetry of the coplanar waveguide. A symmetrical structure is needed in order to minimize reflections taking place at the external transition (not shown) connecting the launcher to a coaxial connector. Such a symmetrical structure is only necessitated by the circular symmetry of the coaxial connector itself. If some other type of connector were used, other than a circular coaxial connector, this symmetry requirement for the tapered launcher 5 may be relaxed.

FIG. 6 shows the main design parameters of the optical modulator, i.e. the modulator length Li, the stub length L2, the delay line length L4 (L4=L41+L42+L43+L44) and the taper length L3. Other relevant parameters in defining the design of the modulator 10 are the coplanar waveguide gaps S, that is, the distances between the electrodes 3 or 5 and the ground electrode 4, and the strip widths W of the electrodes, as shown in FIGS. 5A and 5B. This stub-line arrangement, generally shown in FIG. 6, has a preferred frequency range above 1 GHz. With lower frequencies, the length of the stubs to be used becomes large, causing a corresponding increase in the overall chip length.

Applicants have previously discovered, as disclosed in PCT application WO 99/09451, that the modulating efficiency may be optimized by adjusting a ratio between the wavelength of the microwave signal and the length of the electrode 3, i.e. $\lambda/L1$. The length L1 of the electrode 3 can be advantageously chosen so that $\lambda/L1$ is between 2.1 and 4.0, preferably between 2.3 and 3.1, and even more preferably of about 2.7, which provides an optimum modulating efficiency. Alternatively, if the length L1 of electrode 3 is constrained, the wavelength $\lambda$ of the microwave modulating signal may be adjusted to provide a ratio in the above range. The above design factor may be considered when designing the impedance matching network according to the present invention.

An exemplary phase modulator for operations around 2 GHz was designed with the geometry in Table 1. This phase modulator design is graphically shown in FIG. 7. The design shown in FIG. 7 differs from that shown in FIG. 6 in that L41 is zero (i.e., not present). In order to avoid confusion between the section L42 of the delay line and the electrode section L1 in FIG. 6, it should be noted that the gap S between L42 and the ground electrode is high enough (typically, greater than 50 $\mu$m) to guarantee that a negligible electro-optic effect is generated in that region. On the other hand, a strong electro-optic effect is generated in the region L1 of the electrode, due to lower gap S (typically in the range 5–15 $\mu$m). Further, the launcher 5 includes a straight portion at the narrow end of its tapered portion.

TABLE 1

| | Length, mm | Length reference name | S, micron | W, micron |
|---|---|---|---|---|
| Modulator | 16.000 | L1 | 10 | 80 |
| Stub | 1.500 | L2 | 76 | 80 |
| Tapered Launcher | 1.609 | L3 | From 650 to 73 | From 500 to 80 |
| Delay Line | 0.000 | L41 | — | — |
| | 0.500 | L42 | 76 | 80 |
| | 0.415 | L43 | 100 | 80 |
| | 0.500 | L44 | 76 | 80 |

Figure 7:
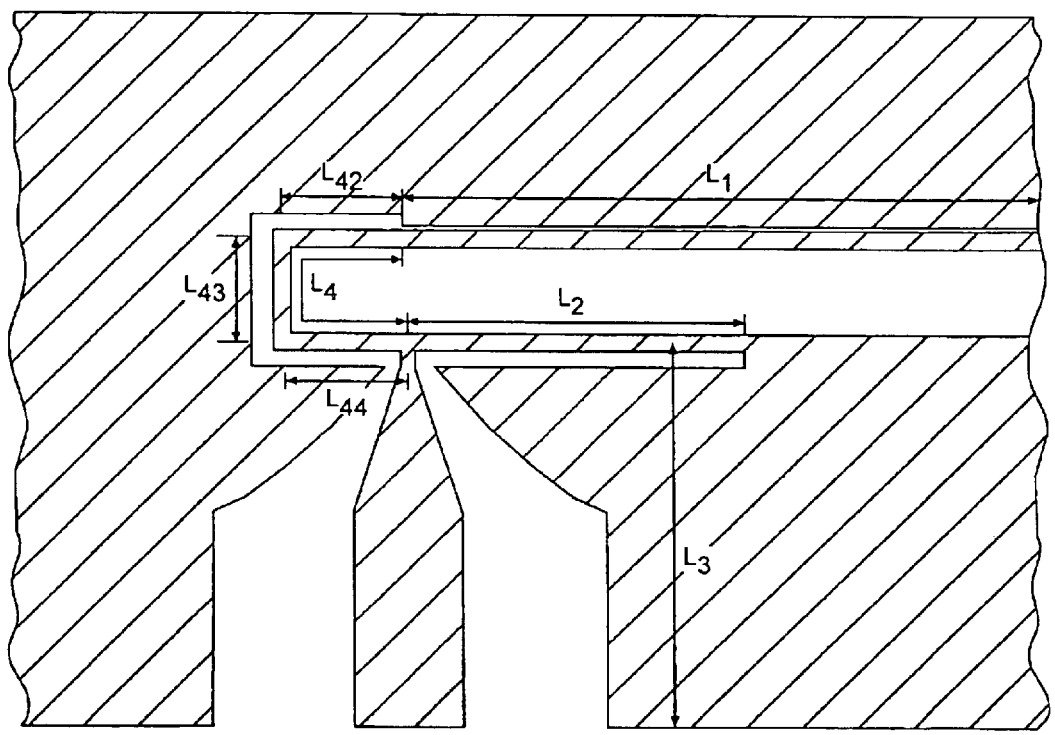
FIG. 7 is a top view of an exemplary phase modulator design.

All of the dimensions in the above table, L1, L2, L3, L41, L42, L43, L44, S, and W, correspond to the dimensions shown in FIGS. 5A, 5B, and 6. The larger dimensions of S and W for the launcher occur at the edge of the chip, while the smaller dimensions occur at the interface with the delay line and the stub. The chip used for the above design was 2 cm long, 0.5 cm wide and 0.1 cm thick; the layer of $SiO_2$ was 0.5 $\mu$m thick; the thickness of the Au electrodes was 5 $\mu$m. Of course, the dimensions listed above and shown in FIG. 7 are but one configuration of the general embodiment shown in FIGS. 4 and 6, and are not limitative of the invention. Other configurations either more simple or more complex, are possible.

As a second example, the following Table 2 defines another geometry similar to that described in FIG. 7, but containing some different parameters for the matching network.

TABLE 2

| | Length [mm] | Name | S [micron] | W [micron] |
|---|---|---|---|---|
| Modulator | 16 | L1 | 10 | 80 |
| Stub | 1.5 | L2 | 80 | 80 |
| Tapered Launcher | 1.1 | L3 | From 650 to 73 | From 500 to 80 |
| Delay Line | 0 | L41 | — | — |
| | 1.8 | L42 | 80 | 80 |
| | 0.550 | L43 | 140 | 80 |
| | 1.8 | L44 | 80 | 80 |

The impedance value (in ohms) of the active electrode plus the delay line 7 (without the stub 6 and the input taper) in the modulator of the present second example has been determined, at a frequency of 2.1 GHz, as:

$Z=3.16-j\ 12.2$

In the present example, the impedance of stub alone is:

$Z_6=0.3+j\ 11.7$

The corresponding total input impedance of the modulator without the launcher and the connector transition is:

$Z=39.9-j\ 14.4.$

Taking into account the input launcher and the connector transition the input impedance $Z_{IN}$ of the device reaches a value even closer to 50 ohms. Applicants have measured, for the second example modulator, an input impedance at a frequency of 2.1 GHz of:

$Z_{IN}=49.4+j\ 1.12$

This input impedance matches well with the standard 50 ohms impedance of RF generators.

Figure 8:
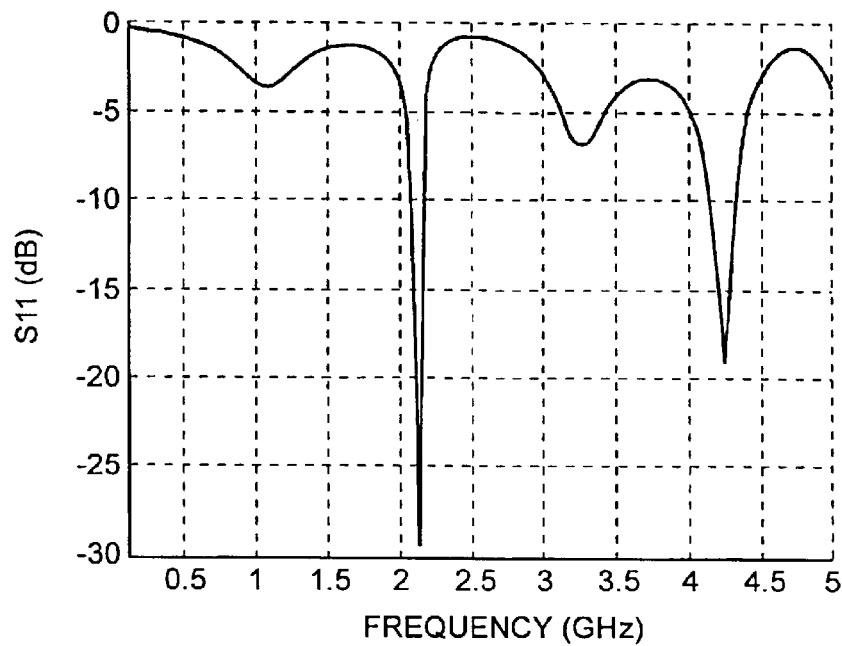
FIG. 8 is a plot of the input reflection coefficient of an exemplary electro-optic modulator with built-in matching network as a function of frequency.

FIG. 8 shows the measured frequency response of the input reflection coefficient S11 in the band 0–5 GHz for the modulator according to the design set forth in Table 2. Such measurement was performed by means of a conventional electrical network analyzer in the bandwidth 0–7 GHz, connected to a 3.5 mm SMA connector soldered to the modulator chip. As mentioned earlier, complete reflection would result in $S_{11}=0$ dB, indicating that all input power is reflected. A notch in the reflection coefficient corresponds to a peak in power transfer efficiency to the modulator. The values of some reflectivity notches (two of them are visible in FIG. 8) is reported below in Table 3.

TABLE 3

| Freq. [GHz] | 2.125 | 4.234 | 5.2 | 6.311 |
|---|---|---|---|---|
| $S_{11}$ [dB] | −29.2 | −19 | −38 | −19.7 |

In particular, a return loss $S_{11}$ lower than −12 dB was achieved on a bandwidth $\Delta f$ of 60 MHz around a center frequency $f_0=2.125$ GHz.

A corresponding series of measurements was carried out for the modulator of the first example, with the design of Table 1. A return loss $S_{11}$ lower than −12 dB was achieved (data plot not shown) on a bandwidth $\Delta f$ of 82 MHz around a center frequency $f_0=1.805$ GHz. The depth of the notch at $f_0$ was measured as −42.8 dB. This means that at the center frequency $f_0$, less than $10^{-4}$ of the input power from the modulating signal source was reflected by the modulator. The value of $V\pi$, i.e. the RF voltage needed to induce a 180° phase modulation, measured with a standard spectral analysis of a phase modulated light at 1550 nm provided by a DFB laser, was only 6.0 V at 1.8 GHz. In contrast, for a modulator with the same geometrical dimensions of the RF electrode, but without the matching network, the measured value of $V\pi$ was 8.5 V at 1.8 GHz, a significant increase in the voltage needed to induce a 180° phase modulation.

Hence, for a given modulating source power, the modulation of the optical signal is maximized with matched impedances as above. Looking at it another way, for a given amount of modulation desired, the modulating source power needed is minimized, resulting in less heating and reduced thermal stabilization problems of the device. In either way of viewing the result of increased power transfer, the modulating efficiency is increased. A further advantage of an increased modulation efficiency is the possibility of using less costly RF drivers.

A resonant electrode structure can also be associated with an amplitude modulator, instead of a phase modulator. Normally amplitude modulators are required to be wideband and not narrowband. However, a resonant, narrowband amplitude modulator can be used, for example, for pulse shaping, i.e., modifying optical pulses according to a specific shape. A resonant, narrow band amplitude modulator also can be used for gating, i.e., time filtering optical pulses according to a preselected time window, such as demultiplexing a channel in Optical Time Division Multiplexing (OTDM).

Figure 9:
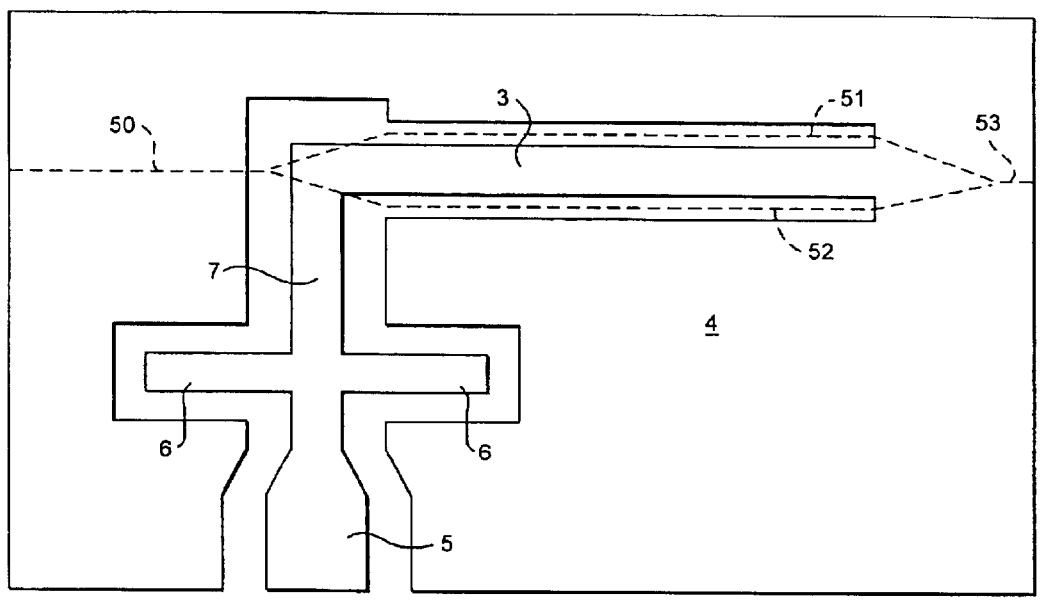
FIG. 9 is a schematic diagram of a resonant amplitude modulator according to the present invention.

A schematic diagram of an exemplary resonant amplitude modulator according to the invention is shown in FIG. 9. The Mach Zehnder interferometer structure shown in FIG. 9 comprises, on a lithium niobate crystal, an input waveguide 50, two interferometer arms 51, 52 and an output waveguide 53. Y couplers optically connect the input (and output) waveguides with the interferometer arms. A resonant electrode structure comprises an input (tapered) launcher 5, a stub structure with two stubs 6, a delay line 7, and a hot (RF) electrode 3 located on the substrate in the region between the two waveguide arms 51, 52. The hot electrode 3 is short circuit connected to ground 4 in a region where the two interferometer arms start tapering towards the output waveguide. The gap S between the hot (RF) electrode 3 and the ground electrodes 4 in the "active" region (the region of parallel waveguide arms) is about 10 μm. The gap S between the stubs 6 or the delay line 7 and the ground electrode 4 is about 80–100 μm.

It will be apparent to those skilled in the art that various modifications and variations can be made in the disclosed process and product without departing from the scope or spirit of the invention. For example, the impedance to be matched can be other than 50 ohms.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An optical transmission system, comprising:
   an optical source for generating an optical signal;
   an RF signal source for generating an RF signal at a predetermined frequency, the RF signal source having an impedance;
   a resonant optical phase modulator for modulating the phase of the optical signal according to the RF signal;
   an optical amplifier for amplifying the optical signal to a power greater than 6 dBm;
   an optical fiber line for transmitting the amplified and phase modulator optical signal;
   wherein the resonant optical phase modulator includes:
      an electro-optical substrate;
      an optical waveguide formed in the substrate and having a variable index of refraction;
      an active modulator electrode formed on the substrate in relation to the waveguide to effect electro-optical variation of the index of refraction upon application to the electrode of a modulating signal;
      an interface port formed on the substrate and providing the RF modulating signal to the electrode;
      an electrical structure, formed on the substrate and coupled to the interface port and the electrode, an impedance of the optical modulator including the interface port and the electrical structure being substantially equal to the impedance of the RF signal source.

2. A resonant optical modulator, comprising:
   an electro-optical substrate;
   an optical waveguide formed in the substrate and having a variable index of refraction;
   an active modulator electrode formed on the substrate in relation to the waveguide to effect electro-optical variation of the index of refraction upon application to the electrode of a modulating signal at a frequency around a resonant frequency;
   an interface port formed on the substrate and providing the modulating signal to the electrode from a signal source, the signal source having an impedance; and
   an electrical structure, formed on the substrate and coupled to the interface port and the electrode, an impedance of the optical modulator including the interface port and the electrical structure being substantially equal to the impedance of the signal source.

3. A resonant optical modulator as recited in claim 2, wherein the active modulator electrode is connected to a ground.

4. A resonant optical modulator as recited in claim 2, wherein the electrical structure includes a delay line connected between the interface port and the electrode.

5. A resonant optical modulator as recited in claim 4, wherein the electrical structure includes a resonant stub connected at a first end to the interface port.

6. A resonant optical modulator as recited in claim 4, wherein the delay line has a length greater than λ/40, where λ is the wavelength in the delay line of a RF signal at the resonant frequency.

7. A resonant optical modulator as recited in claim 2, wherein the resonant frequency is in the range of 0.5 to 5 GHz.

8. A resonant optical modulator as recited in claim 7, wherein the resonant frequency is in the range of 1 to 4 GHz.

9. A resonant optical modulator, comprising:
   an electro-optical substrate;
   an optical waveguide formed in the substrate and having a variable index of refraction;
   an active modulator electrode having a termination to ground and formed on the substrate in relation to the waveguide to effect electro-optical variation of the index of refraction upon application to the electrode of a modulating signal at a resonant frequency;
   an interface port formed on the substrate for providing the modulating signal to the electrode from a signal source;
   a first electrical element formed on the substrate and connected between the interface port and the electrode; and
   a second electrical element formed on the substrate and connected between the interface port and ground.

10. A resonant optical modulator as in claim 9, wherein a total impedance of the electrode, the interface port, the first electrical element, and the second electrical element substantially equals an impedance of the signal source.

11. A resonant optical modulator, comprising:
   means for modulating an optical signal in an electro-optical substrate, said means for modulating being formed on the substrate;
   means for providing an electrical modulating signal at a resonant frequency from a signal generating means, said means for providing being formed on the substrate; and
   means, coupled to the means for providing and the means for modulating, for causing an impedance of the optical modulator to be substantially equal to the impedance of the signal generating means, said means for causing being formed on the substrate;
   wherein the means for causing includes a means for delaying the modulating signal connected between the means for providing and the means for modulating.

12. A resonant optical modulator, comprising:
   means for modulating an optical signal in an electro-optical substrate, said means for modulating being formed on the substrate;
   means for providing an electrical modulating signal at a resonant frequency from a signal generating means, said means for providing being formed on the substrate; and
   means, coupled to the means for providing and the means for modulating, for causing an impedance of the optical modulator to be substantially equal to the impedance of the signal generating means, said means for causing being formed on the substrate;
   wherein the means for causing includes a shunt means connected between the means for providing and ground.

13. A resonant optical modulator, comprising:

means for modulating an optical signal in an electro-optical substrate, said means for modulating being formed on the substrate;

means for providing an electrical modulating signal at a resonant freguency from a signal generating means, said means for providing being formed on the substrate; and means, coupled to the means for providing and the means for modulating, for causing an impedance of the optical modulator to be substantially equal to the impedance of the signal generating means, said means for causing being formed on the substrate;

wherein the means for providing decreases in width from the signal generating means to its connection with the means for delaying.

14. A resonant optical modulator as recited in claim 2, wherein the active modulator electrode has an impedance that is mostly reactive.

15. A resonant optical modulator as recited in claim 5, wherein the delay line and the stub each have an impedance, and the impedance of the active modulator electrode is compensated for by the impedance of the delay line and the impedance of the stub.

16. The optical transmission system of claim 1, wherein the active modulator electrode is linear.

17. The optical transmission system of claim 2, wherein the active modulator electrode is linear.

18. The resonant optical modulator of claim 9, wherein the active modulator electrode is linear.

* * * * *